(12) United States Patent
Meyer et al.

(10) Patent No.: US 10,706,202 B1
(45) Date of Patent: Jul. 7, 2020

(54) DEVICES AND METHODS FOR BALANCED ROUTING TREE STRUCTURES

(71) Applicant: Cadence Design Systems, Inc., San Jose, CA (US)

(72) Inventors: Dirk Meyer, Elsworth (GB); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 69 days.

(21) Appl. No.: 16/228,473

(22) Filed: Dec. 20, 2018

(51) Int. Cl.
| | |
|---|---|
| *G06F 17/50* | (2006.01) |
| *G06F 30/396* | (2020.01) |
| *G06F 30/394* | (2020.01) |
| *G06F 30/3947* | (2020.01) |
| *G06F 30/347* | (2020.01) |
| *G06F 30/398* | (2020.01) |
| *G06F 30/3312* | (2020.01) |
| *G06F 30/337* | (2020.01) |
| *G06F 30/30* | (2020.01) |
| *G06F 30/39* | (2020.01) |
| *G06F 117/10* | (2020.01) |
| *G06F 119/12* | (2020.01) |

(52) U.S. Cl.
CPC .......... *G06F 30/396* (2020.01); *G06F 30/347* (2020.01); *G06F 30/394* (2020.01); *G06F 30/3947* (2020.01); *G06F 30/30* (2020.01); *G06F 30/337* (2020.01); *G06F 30/3312* (2020.01); *G06F 30/39* (2020.01); *G06F 30/398* (2020.01); *G06F 2117/10* (2020.01); *G06F 2119/12* (2020.01)

(58) Field of Classification Search
None
See application file for complete search history.

(56) References Cited

U.S. PATENT DOCUMENTS 6,910,195 B2 * 6/2005 Akkiraju ................. G06F 30/30
716/114
6,996,512 B2 * 2/2006 Alpert ................... G06F 30/392
703/14

(Continued)

OTHER PUBLICATIONS

C. Y. Lee, "An Algorithm for Path Connections and Its Applications," IRE Trans. on Electronic Computers, Sep. 1961, pp. 346-365. (Year: 1961).*

(Continued)

*Primary Examiner* — Leigh M Garbowski
(74) *Attorney, Agent, or Firm* — Schwegman Lundberg & Woessner, P.A.

(57) ABSTRACT

Systems, methods, media, and other such embodiments described herein relate to generation of routing trees. One embodiment involves accessing a circuit design with a source and a plurality of sinks, and then using a first bottom-up wavefront analysis to select branch point candidates for the sinks. A branch point cost function is used to select among the branch point candidates. This process may be repeated until a final tier of analysis results in a final wavefront that is within a threshold distance of the source. The selected branch points are then used in generating a routing tree between the source and the sinks. In various different embodiments, different cost point functions may be used, and different operations used to manage obstructions or other specific routing considerations.

20 Claims, 13 Drawing Sheets

(56) References Cited

U.S. PATENT DOCUMENTS

| 7,127,696 B2* | 10/2006 | Alpert ................... G06F 30/394 |
| | | 716/114 |
| 7,392,495 B1* | 6/2008 | Cherukupalli .......... G06F 30/39 |
| | | 716/114 |
| 7,809,971 B2* | 10/2010 | Shimobeppu ............. G06F 1/10 |
| | | 327/156 |
| 10,289,795 B1* | 5/2019 | Gao ...................... G06F 30/394 |

OTHER PUBLICATIONS

C. Uttraphan et al., "An optimized buffer insertion algorithm with delay-power constraints for VLSI layouts," Turkish Journal of Electrical Engineering & Computer Sciences, vol. 25, Jan. 2017, pp. 844-861. (Year: 2017).*

* cited by examiner

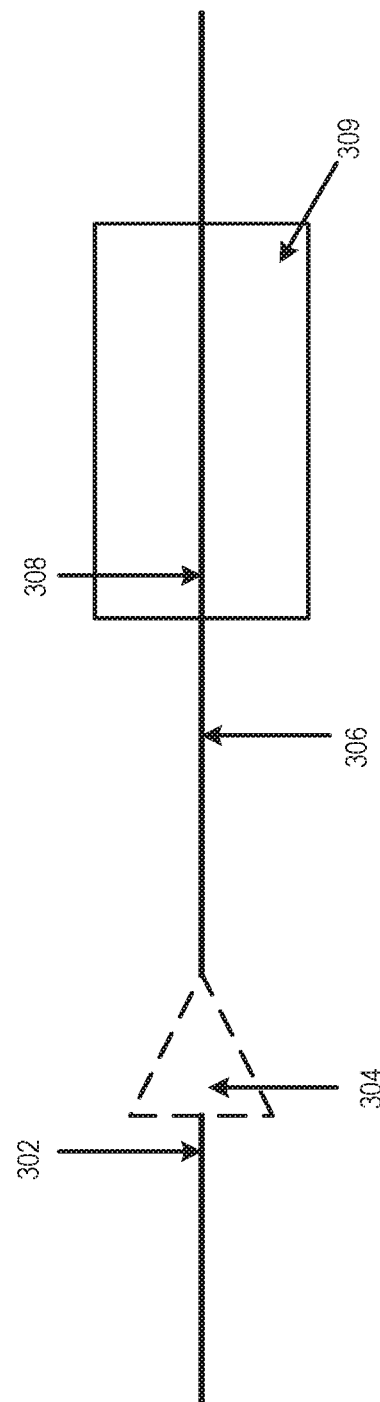

DEVICES AND METHODS FOR BALANCED ROUTING TREE STRUCTURES

TECHNICAL FIELD

Embodiments described herein relate to electronic design automation (FDA), and to systems, methods, devices, and instructions for generating circuit designs including balanced routing trees.

BACKGROUND

Electronic design automation (EDA) is a category of systems for assisting with the design of electronic systems and devices. Large, integrated circuit designs are often assembled from previously designed blocks. This enables reduced turnaround times for generation of an integrated circuit. Automated design of routing connections between individual circuit elements or design blocks are also part of such EDA system operations. Schematic and layout information for such block portions of a design may be exchanged or licensed as intellectual property. Timing analysis is an EDA verification analysis whereby the timing of circuit elements and/or circuit blocks is analyzed to verify that the design meets constraints in order to operate at intended clock rates in an expected operating environment.

BRIEF DESCRIPTION OF THE DRAWINGS

Various ones of the appended drawings merely illustrate example embodiments of the present disclosure and should not be considered as limiting its scope.

FIG. 3A illustrates aspects of routing tree generation, in accordance with some embodiments described herein.

DETAILED DESCRIPTION

Embodiments described herein relate to EDA and to methods, computer media, and devices used for analyzing, optimizing, and creating electronic circuits. One of the many complex elements of circuit design is the generation of routing trees that convey a signal from a signal origin, or source, to a signal destination, or sink. A clock tree, for example, has a single source and may be attached to hundreds or thousands of destination sinks. Additionally, the design may have limits on the amount of time a signal can take to get to the furthest sink (e.g., a maximum arrival time) as well as limits on the differences between arrival times at various sinks and limits on the total wavelength in a tree. The specific layout of a routing tree may be set based on various "costs" associated with different layout elements, such as length mismatches, routing turns, or other physical layout characteristics that degrade performance.

Some embodiments herein describe an approach to generating a routing tree using routing to branch points (e.g. intermediate routing points) to decrease skew while limiting the extra wire used in a routing tree. In embodiments described herein, a wavefront analysis is used to identify branch points for different tiers or levels of a routing tree (e.g., with each tier or level except for the final level having associated branch points). Additional details of various embodiments for selecting branch points for routing tree generation using bottom-up wavefront analysis are described below.

Figure 1:
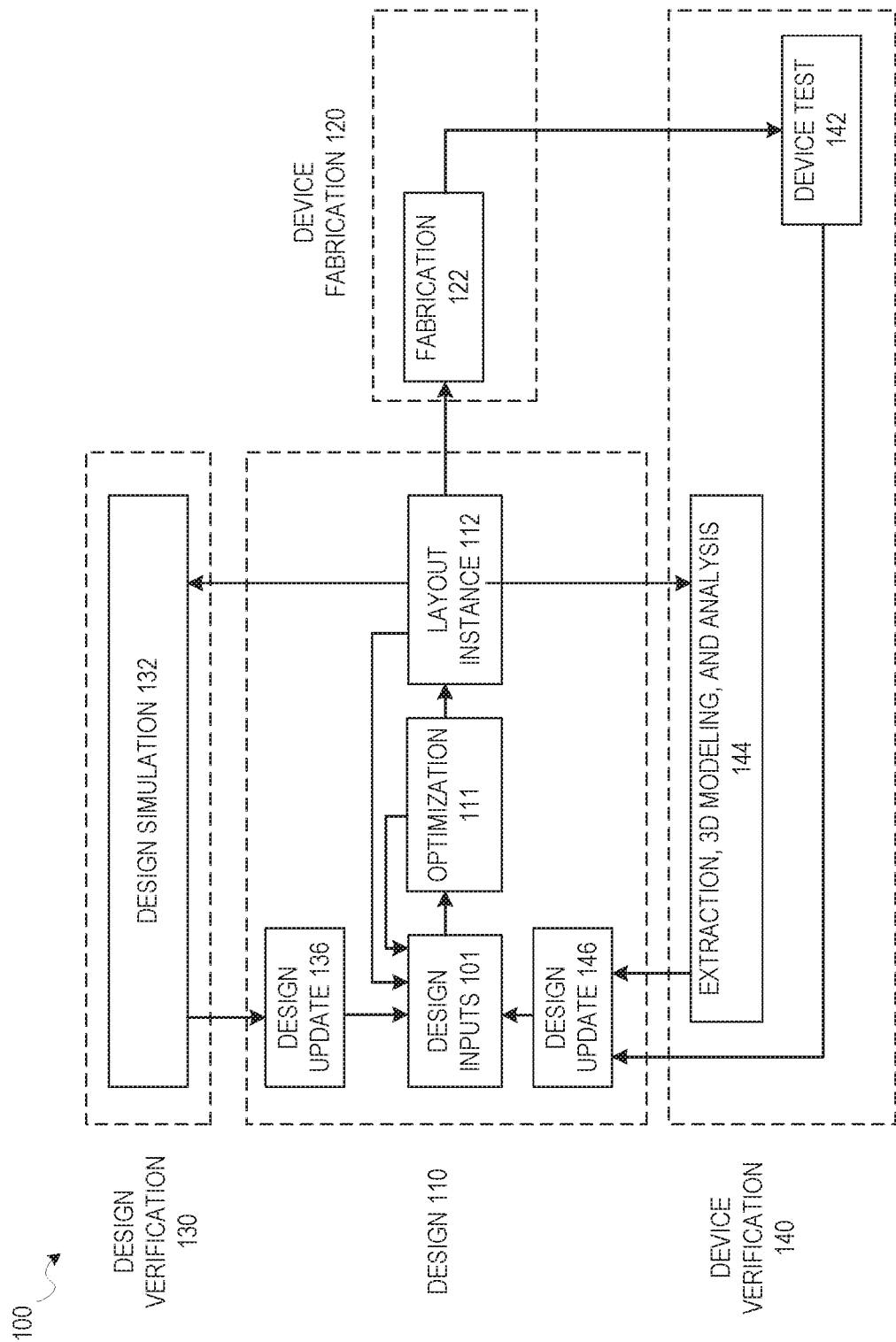
FIG. 1 is a diagram illustrating one possible design process flow which includes elements for routing tree generation, in accordance with some embodiments.

FIG. 1 is a diagram illustrating one possible design process flow which includes elements for routing tree generation, in accordance with some embodiments. This includes possible design process flows for timing and signal integrity analysis to generate a circuit design and an associated circuit, in accordance with various example embodiments, and operations for automatically modifying such circuits to generate routing tree structures that comply with limits on skew, wire length, maximum arrival time, and other such timing considerations. It will be apparent that other design flow operations may function using the timing constraints and optimizations described herein, but design flow 100 is described here for the purposes of illustration. As illustrated, the overall design flow 100 includes a design phase 110, a device fabrication phase 120, a design verification phase 130, and a device verification phase 140. The design phase 110 involves an initial design input operation 101 where the basic elements and functionality of a device are determined, as well as revisions based on various analyses and optimization of a circuit design, This design input operation 101 is where initial layouts for a balanced clock tree structure and sinks are generated, before adjustments are made to ensure that timing requirements for each sink are met. The initial strategy, tactics, and context for the device to be created are also generated in the design input operation 101 depending on the particular design algorithm to be used.

In some embodiments, following an initial selection of design values in design input operation 101, a routing tree may be generated, in accordance with various embodiments described, herein during optimization operation 111 or layout instance 112, along with any other automated design processes. As described below, design constraints for a routing tree structure and sinks which receive a signal from the routing tree structure may be initiated with design inputs in design input operation 101, and then may be analyzed using timing analysis according to various embodiments. In accordance with embodiments described herein, such inputs may include a maximum wire length for a routing tree, a maximum arrival time for the sinks connected to the routing time, allowable skew values, weights and/or costs for branch point components in a routing tree, or other such design characteristics. While design flow 100 shows such optimization occurring prior to layout instance 112, updates to a routing tree may be performed at any time to improve expected operation of a circuit design. For example, in various embodiments, constraints for blocks in a circuit design may be generated prior to routing of connections in a circuit design, after routing, during register transfer level (RTL) operations, or as part of a final signoff optimization or verification prior to a device fabrication operation 122. Certain embodiments of operations described herein for generating or updating a routing tree structure may therefore involve iterations of design input operation 101, optimization operation 111, and layout instance 112 generation. In other systems, other design processes may be used.

After design inputs are used in design input operation 101 to generate a circuit layout, and any optimization operations 111 are performed, a layout is generated in layout instance 112. The layout describes the physical layout dimensions of the device that match the design inputs. This layout may then be used in a device fabrication operation 122 to generate a device, or additional testing and design updates may be performed using designer inputs or automated updates based on the design simulation 132 operations or extraction, 3D (three-dimensional) modeling, and analysis 144 operations. Once the device is generated, the device can be tested as part of device test 142 operations, and layout modifications generated based on actual device performance.

Design updates 136 from design simulation 132, design updates 146 from device test 142 or extraction, 3D modeling, and analysis 144 operations, or direct design input operation 101 may occur after an initial layout instance 112 is generated. in various embodiments, whenever design inputs are used to update or change an aspect of a circuit design, a timing analysis and optimization operation 111 may be performed.

Figure 2:
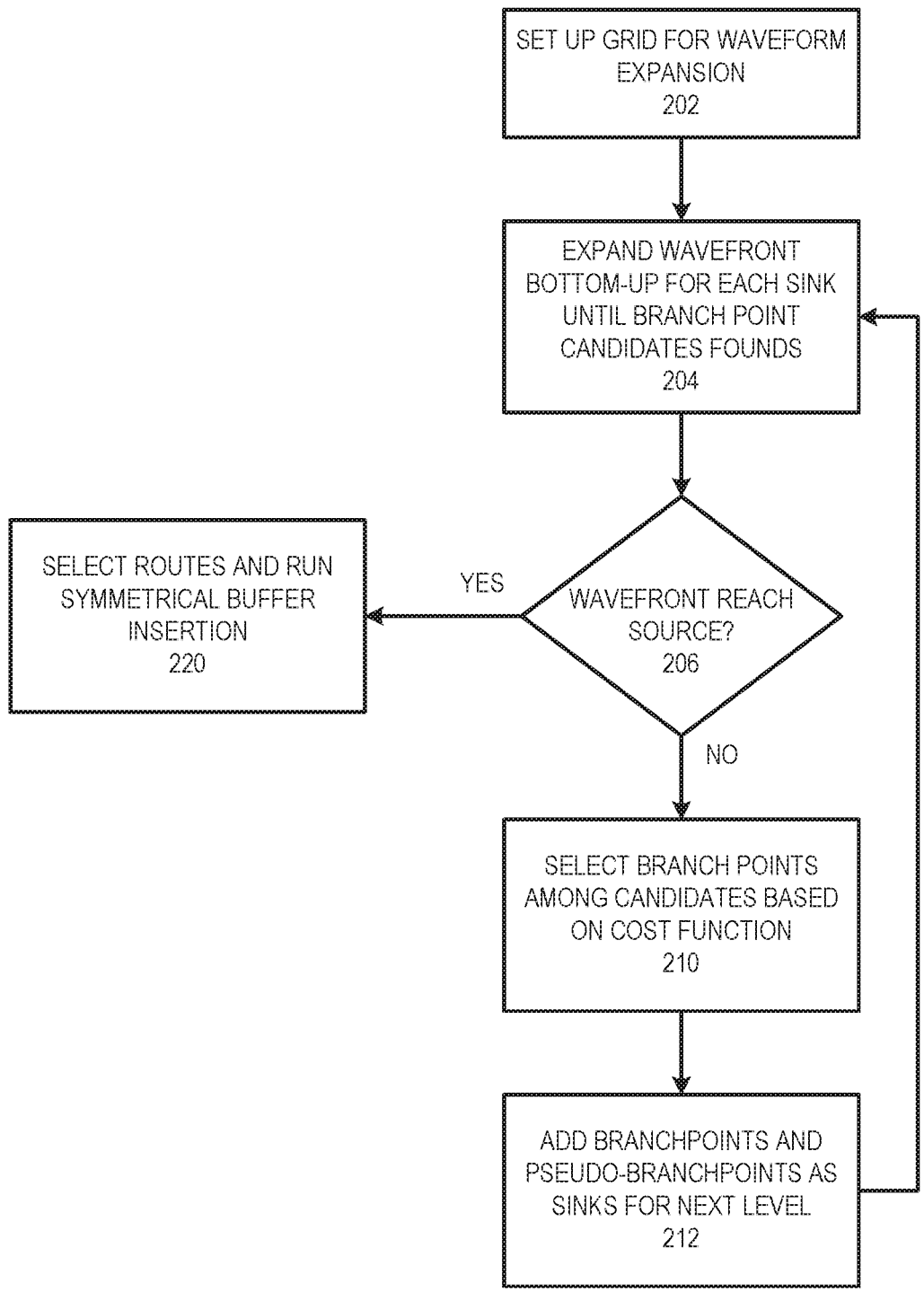
FIG. 2 is a flowchart illustrating aspects of routing tree generation, in accordance with some embodiments described herein.

FIG. 2 is a flowchart illustrating aspects of routing tree generation, in accordance with some embodiments described herein. The operations of FIG. 2 begin with operation 202 which involves setting up a grid with associated placement information (e.g. a GCELL; grid which includes blockage and/or placement limitation information) for a waveform extraction. As described in further detail below, the circuit design includes a source and a plurality of sinks. In order to identify branch points for a balanced routing tree, a waveform expansion is performed at different tiers or levels. This waveform expansion identifies intermediate points between sinks that are used to create a balanced structure of the tree. In some embodiments, this waveform expansion occurs in the context of a grid associated with routing limitations of the circuit design. In other embodiments, the waveform expansion may be done using circles or other waveform expansion shapes which are standardized and analyzed independently of a grid system. In the embodiment of FIG. 2, the grid set up may involve a square grid where expansions occur one segment at a time away from a point where a sink is located. In other embodiments, various different grid systems may be used. Operation 202 essentially initializes the wavefront expansion based on the given sink locations on the grid of available routing segments (also known as GCELL grid), which is augmented by placement information.

In operation 204, a bottom up wavefront expansion is performed for each sink and tell branch point candidates are found. This bottom-up wavefront expansion may be performed in a variety of different ways. In one embodiment, a wavefront is set for each sink. The shape of the waveform for each sink is the same at each step of the wavefront expansion. The initial small wavefronts are unlikely to overlap given standard sink structures. As the waveforms for each sink grow larger and larger together, the wavefronts will eventually overlap. When the wavefronts for two sinks overlap, the overlap or touching areas and areas around these spaces are identified as branch point candidates. These wavefront intersections essentially are a way of identifying the halfway points of electrical distances between sinks. If the intersection of two wavefronts is in a space where there is a known blockage from other circuit elements, the wavefront expansion may continue until all wavefront intersection points outside of the blockage are identified. At each level or tier of a routing tree, this bottom-up wavefront expansion is performed until each sink is associated with a set of branch point candidates.

In some embodiments of operation 204, the wavefront expansion may be structured as a set of wavefront data structures with one wavefront data structure for each initial point (e.g., the sinks in the first level, or the branch points from the previous levels for subsequent levels after the first level). As described herein, a "sink" for a particular level refers to either an actual sink component within the design or branch points selected to connect sinks or branch points from a previous level. The wavefronts expand out from the initial points at the same rate until they collide. As they expand, the wavefronts are annotated with information such as the accumulated net length, repeater levels, and the distance to the point where a placement blocked area was entered. In some embodiments, to minimize the source-to-sink distance (e.g., the electrical distance), the wavefronts are expanded without increasing the target sink to source distance, which was pre-computed. Using this information, only bufferable paths, subject to a maximum repeater distance, are expanded. Other information, such as the minimum number of turns and the distance from the last branch point, are recorded. The wavefronts originating from each initial point (e.g., sink or prior level branch point) are expanded until the wavefronts "collide" with wavefronts from other sinks, which gives a set of locations for branch point candidates (e.g., "branch points" in resulting clock tree structure). The expansion of the wavefronts continues past the initial collisions until sufficient branch point pair candidates have been found or an expansion limit is reached, depending on the clustering method used in subsequent operations. If the wavefront of the final branch points reaches the source, the clock tree structure is routed and buffered at operation 220 using some of the information recorded during the bottom-up steps.

In operation 206, after each sink at a level is associated with branch point candidates, a check is done to see if the wavefronts reach the source before branch points are found for each sink. If the wavefronts reached the source, this indicates that the routing tree has identified patents from sinks to the source. In this case, operation 220 proceeds with selecting the identified routes and inserting buffers as appropriate to create symmetry in the routing tree. Additional details associated with buffer insertion are discussed below with respect to FIGS. 3A and 3B. Until the source is reached by the wavefronts, a loop is performed with each loop associated with a new "level" or "tier."

For each tier that does not reach the source, in an associated operation 210, the branch point candidates are analyzed based on weighting values of a cost function for the circuit design system. Specific branch points for each sink are selected. These branch points may, for example, be branch points in an H tree structure. Each such branch point reduces the number of branches as the routes travel from sinks towards the source. In some systems, "pseudo-branch points" are used to provide balance in the structure when an imbalance exists between sinks. For example, if a candidate branch point creates a sufficient imbalance in the structure, a pseudo-branch point with routes that do not lead to any sink may be created for the purpose of providing balance in the routing tree. After all branch points (e.g., including branch points and pseudo-branch points) for a certain level are selected in operation 212, those branch points are then identified as the points to be used for the wavefront expansion analysis for the next level. This procedure then loops back to operation 204, and repeats until the wavefronts for a certain last tier of the routing structure reach the source. In other words, an analysis is done starting with the actual sinks in circuit design. Each sink has an associated wavefront that is expanded at the same rate as wavefronts for each sink are expanded. When these wavefronts overlap by a threshold amount, which is based on the circuit design and any associated blockages, candidate branch points are identified. A cost function is used to select a specific branch point for pairs or other combinations of sinks. Once each sink has an associated branch point, the system adds to a new tier with the branch points operating as the new sinks for the purpose of the wavefront expansion. Each intermediate point then has an associated wavefront, which is expanded until an overlap is identified with another sink/branch point of that tier. This identifies candidate branch points for the next level. Those branch points are then used for a next tier of wavefront expansions. This proceeds until routes via intermediate branch points are created from each sink to the source.

In various embodiments of operation 210, branch points are selected using the following types of decisions. One decision involves the clustering of branch points (e.g., selection of pairs or groups of sinks that should be combined or directly connected to associated branch points). Another decision involves the selection of locations for the branch points once clustering decisions are made. Clustering decisions include various options such as (a) a user describing the topology of the hierarchical clustering of sinks; (b) arranging the sinks in a grid which is used as a guide for clustering; or (c) tool based automatic sink clustering (e.g., based on a graph matching heuristic or some other similar guide or algorithm for automatic clustering). Again, once the branch points are selected, these points are used as the initial points for the next tier or level of waveform expansion. These loops proceed until operation 206 results in the wavefront collisions occurring within a threshold distance of the source. Then operation 220 proceeds with route selection and buffer insertion. Various different heuristics may be used for the actual routing between the sinks and the source via the selected branch points. For example, the actual routing may follow minimum length pass through selected branch points with considerations made for insertions of repeaters around blockages or placement restrictions. In some embodiments, a standard search algorithm (e.g., a beam search) guides the cost-based generation of partial solutions. In some such embodiments, the cost of a partial solution consists of two components. One component is the accumulated cost so far, and the other component is a lower bound on the cost-to-go (e.g., the cost of the not yet expanded partial solutions to reach the sinks for the current wavefront).

TABLE 1

| Component | Description | Weight |
|---|---|---|
| Length mismatch | Difference between branch length of pair and target branch length | α |
| Imbalance | Difference between branch lengths of pair | β |
| Turns | Turns * base length | γ |
| Repeater level increase | Increase * base length | δ |

Some of the cost components used in the heuristic search are listed in table 1 above. In some embodiments, the source-to-sink path length can vary due to the cost-based branch point selection. In some embodiments, the top-down pass is adjusted to deal with this by skipping wavefront analysis on certain branches in order to implement a short or low-cost source-to-sink path length.

Figure 3B:
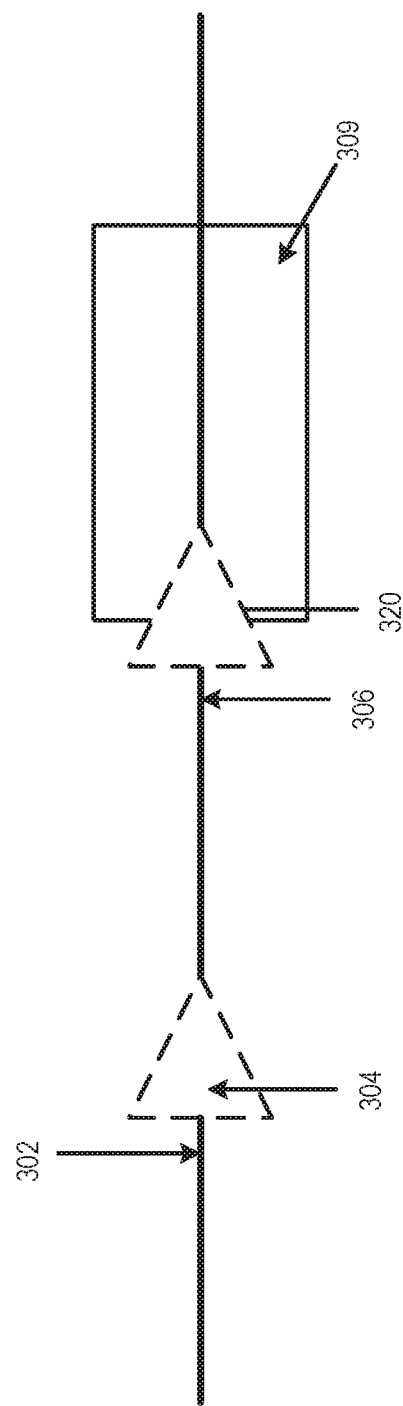
FIG. 3B illustrates aspects of routing tree generation, in accordance with some embodiments described herein.

FIGS. 3A and 3B illustrate aspects of routing tree generation, in accordance with some embodiments described herein. As described above for FIG. 2, once overlapping wavefronts have reached source, routes are selected and symmetrical buffer insertion is performed (e.g., in operation 220). FIGS. 3A and 3B illustrate aspects of the symmetrical buffer insertion. FIG. 3A includes buffer 304 and blockage area 309 along a route. The placement blockage area 309 is an area in the design grid in which no buffer can be inserted, but which allows routing. In order to generate a symmetrical routing tree structure, buffers are inserted as needed outside of placement blockage area 309. For example, analysis of this route at positions 302, 306, and 308 may identify that buffers are needed at positions 302 and 308. Buffer 304 is inserted at position 302, but a buffer cannot be placed at position 308 in blockage area 309. As shown in FIG. 3B, a buffer may be placed at location 306 just outside of placement blockage area 309 in order to provide the needed performance. Displacement may thus consider design criteria such as unprofitable lengths, repeater levels, or other such considerations of buffer placement, During the iterations of wavefront expansion, the costs associated with buffer placement and blockages may be included in the calculations to select a specific branch point from the possible branch point candidates identified by the overlapping wavefronts.

Figure 4:
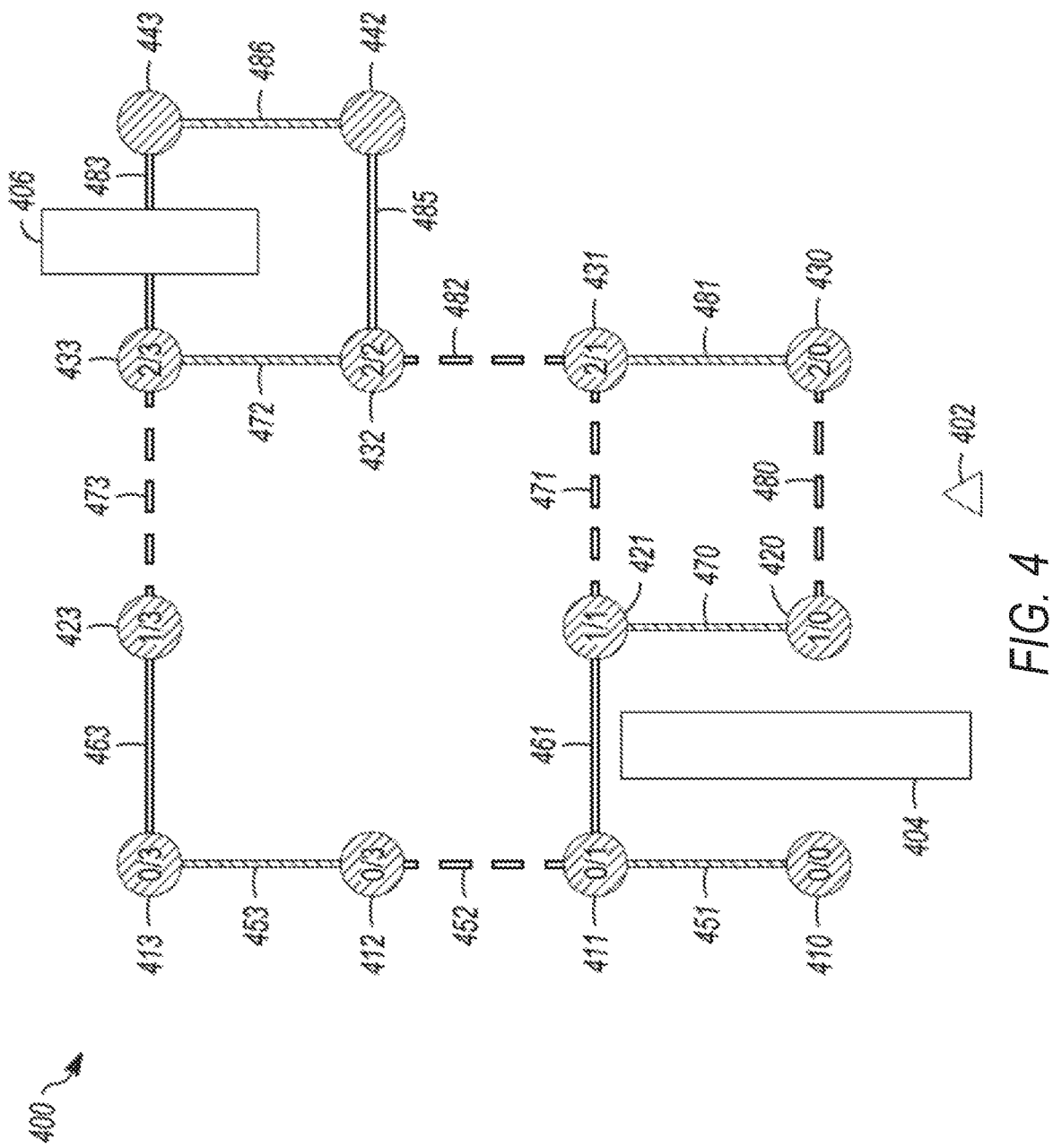
FIG. 4 illustrates aspects of routing tree generation, in accordance with some embodiments described herein.

FIGS. 4-8 illustrates aspects of routing tree generation, in accordance with some embodiments described herein. As discussed above, some embodiments involve arranging the initial points for a level (e.g., sinks, branch points, pseudo branch points, etc.) in a grid which is used as a guide for clustering. FIG. 4 illustrates an example of such clustering while also illustrating aspects of selection of different clustering decisions in such a grid-based embodiment. System 400 of FIG. 4 includes source 402, obstruction areas 404 and 406 (e.g., which may be identified as part of the grid formatting or as part of the circuit design as a place where no routing is allowed), and sinks 410, 411, 412, 413, 420, 421, 423, 430, 431, 432, 433, 442, and 443. As shown, the sinks include column and row assignments. In such a grid layout, wavefronts expanding from each of these sinks may collide in a fashion that produces conflicting possible branch points. For example, the wavefront from sink 413 may collide with the wavefront from sink 423 at the same time that it collides with the wavefront from sink 412. Rather than individually calculating costs for complex combinations of such collisions, such a grid system may assign possible connections for groupings of sinks. In one such embodiment, at each level, a horizontal and vertical clustering direction is tried. The row indices (vertical) or column indices (horizontal) from the previous level are divided by 2, and pairs with the same row/column index can be combined. Other possible pairs (e.g., collisions between wavefronts) are rejected. In FIG. 4, horizontal connections are 463, 473, 483, 485, 461, 471, and 480, and vertical connections are 453, 472, 486, 452, 482, 451, 470, and 481. Dashed edges of connections 473, 452, 482, 471, and 480 indicate pairs that are not selected because their level row/column index pairs do not match.

For each clustering direction (e.g., horizontal or vertical) and the sink pairs selected under grouping options for this direction, the selection of branch point locations are primarily determined by the symmetry but also other properties of the routing tree structure. To encourage wire balancing at each level of clock structure, a target branch length is chosen, such as the length that minimizes the square error between the target length and the minimum length per branch point pair. Some cost components are illustrated above in table 1, but other cost components may be used as well. Note that by adjusting the weights, the resulting total wire length and wire skew can be traded off. The cost components are weighted and added to give the cost of a branch point. The clustering direction resulting in the minimum of the maximum cost for selected pairs is then chosen.

In FIG. 4, the vertical clustering direction is preferred because pairs between sinks 410 and 420 and sinks 433 and 443 are blocked by obstruction areas 404 and 406, which increases the cost of the horizontal direction. No such obstructions exist in the vertical direction, so connections between 410 and 411, sinks 412 and 413, sinks 433 and 432, sinks 421 and 420, sinks 430 and 431, and sinks 443 and 442, and the associated vertical clustering of connections 453, 451, 472, 486, 470, and 481 are selected. As part of this selection (e.g., in an operation similar to operation 210), branch point candidates associated with the vertical direction and ungrouped pairs of sinks are rejected. Branch points are then selected from the remaining candidates (e.g., candidates identified based on the wavefront collisions between the selected sink clusters such as sinks 410 and 420.)

Figure 5:
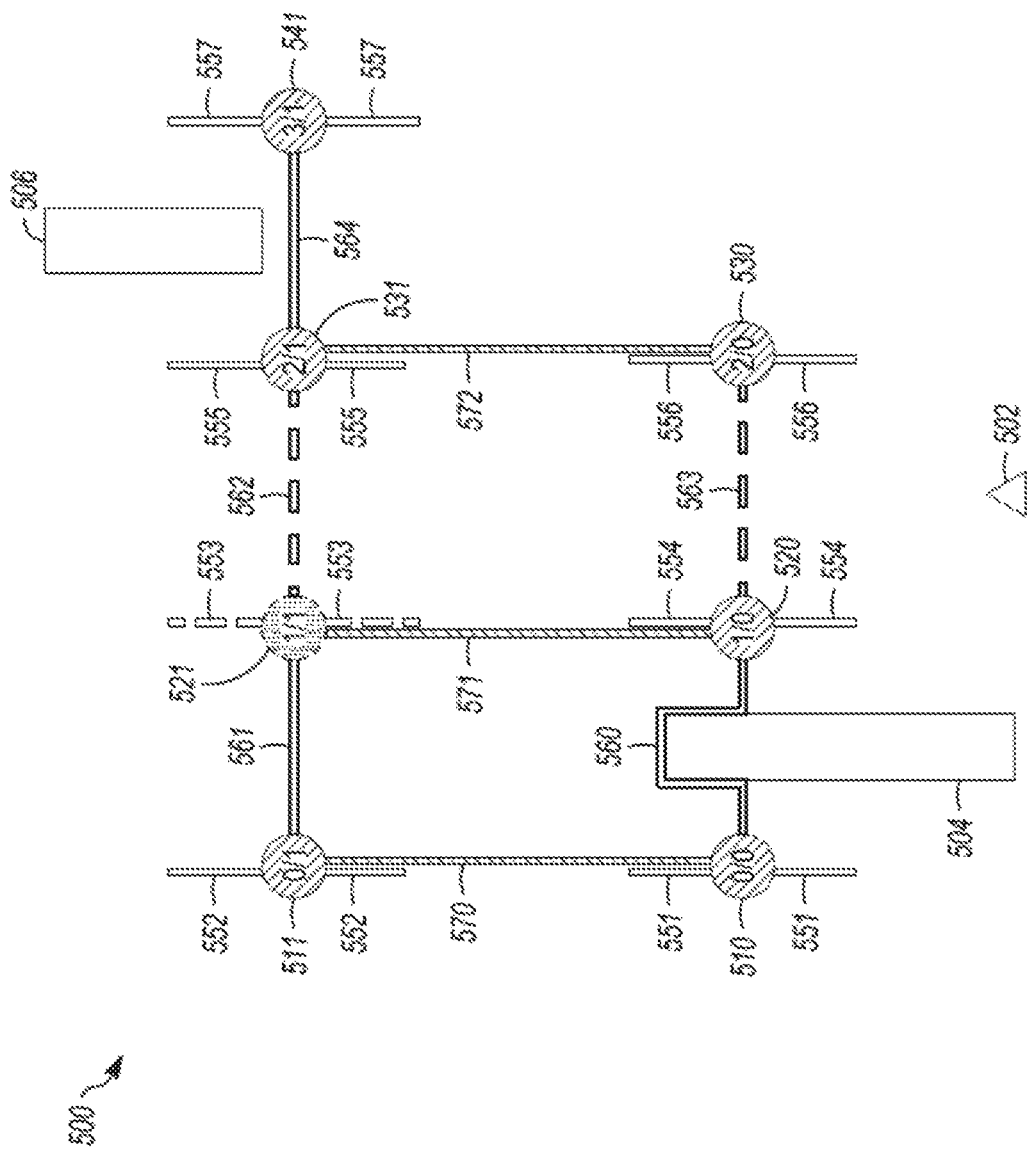
FIG. 5 illustrates aspects of routing tree generation, in accordance with some embodiments described herein.

FIG. 5 illustrates branch point selection operations in a similar grid structure with the addition of "pseudo branchpoints" to balance the routing tree with an odd number of initial points or an imbalanced structure of initial point placements in the grid. System 500 of FIG. 5 includes source 502, obstruction areas 506 and 504, and branch points 510, 511, 520, 530, 531, and 541. Routes 551-557 are routes to a previous level. During balancing operations, a pseudo branchpoint 521 is added, which is used to achieve wire balancing. Connections 562 and 563 are rejected when the rows and columns are matched by dividing the column number by 2 and grouping the matching branch points. Connections 561, 564, and 560 are the remaining horizontal connections after this is done, and connections 570, 571, and 572 are the remaining vertical connections. In FIG. 5, the cost of the connection 560 between branch points 510 and 520 is high as the length mismatch and turn cost component are high for this pair because of obstruction area 504. The horizontal connections are thus rejected and the vertical connections 570-571 selected.

Figure 6:
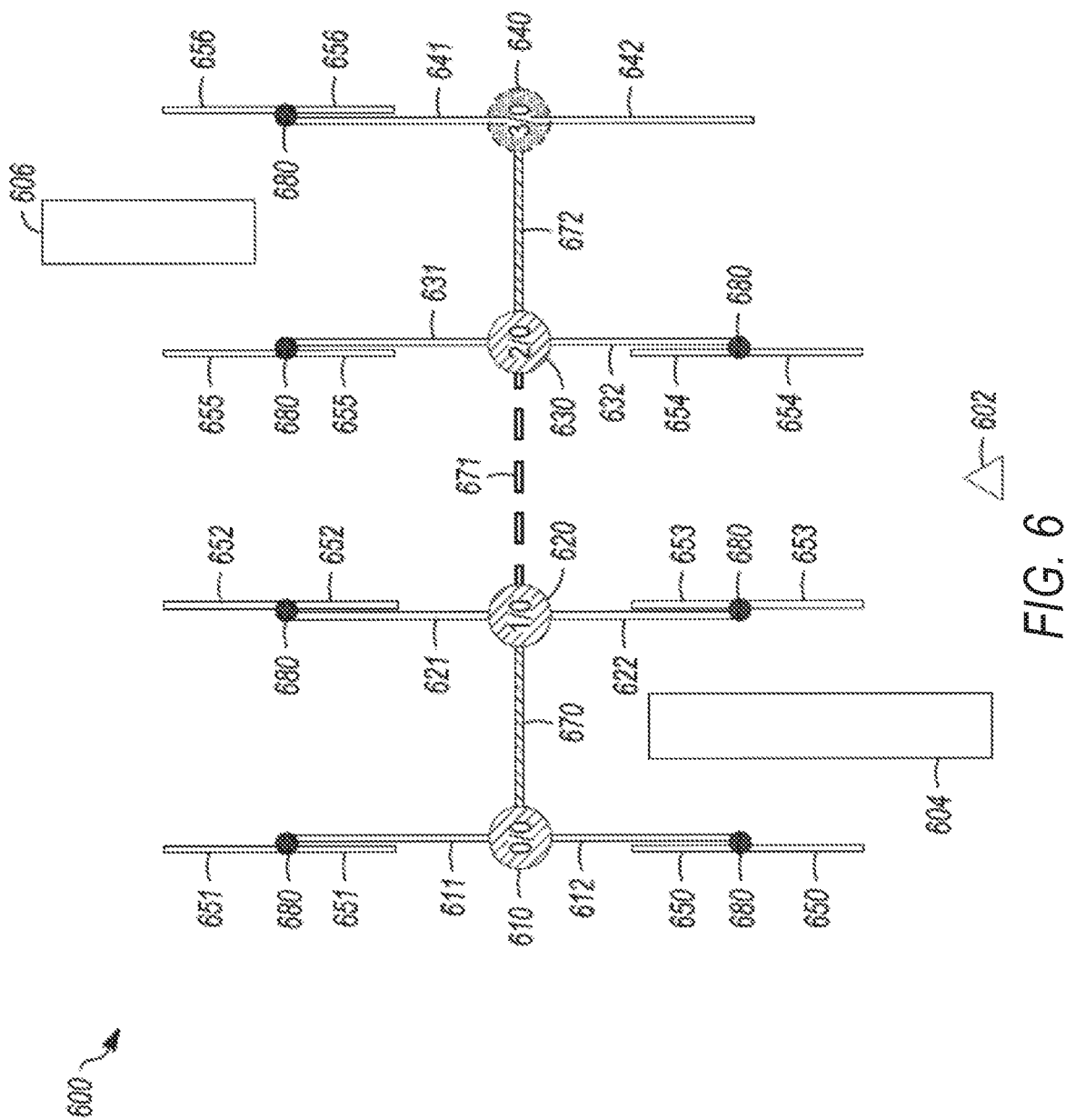
FIG. 6 illustrates aspects of routing tree generation, in accordance with some embodiments described herein.

FIG. 6 then further illustrates branch point selection operations in a grid structure. System 600 of FIG. 6 includes source 602, obstruction areas 604 and 606, and branch points 610, 620, and 630, along with pseudo branch point 640. Previous level branch points 680 are branch points from a previous level routed to the current level branch points 610, 620, 630, and 640 via connections 611, 612, 621, 622, 631, 631, 641, and 642. Similarly, previous level branch points 680 are further connected to a second previous level (e.g., which may be an initial level containing the circuit design sink elements) via connections 650-656. In FIG. 6, pseudo branch point 640 is added for balance, and connection 671 is rejected as branch points 610 and 620 are grouped, and branch points 630 and 640 are grouped to select connections 670 and 672. Just as above, these connections 670 and 672 are used as a basis to select branch points (not shown) for the next level.

Figure 7:
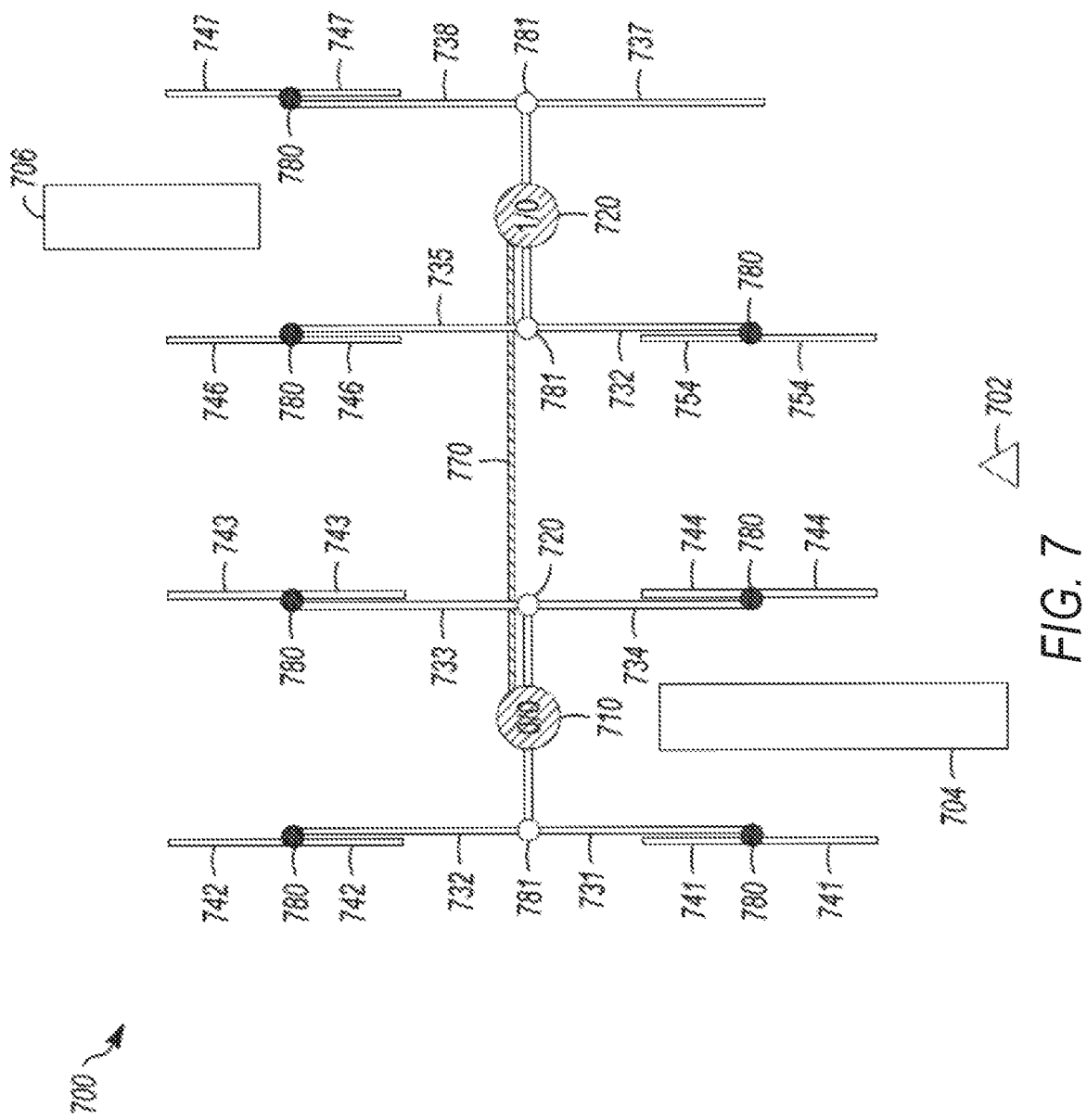
FIG. 7 illustrates aspects of routing tree generation, in accordance with some embodiments described herein.

FIG. 7 illustrates such branch points in branch points 710 and 720, which are connected via connection 770, which is placed in the context of the structure from previous levels of system 700, including branch points 780 and 781, source 702, obstruction areas 704 and 706, and routes 732-747.

Figure 8:
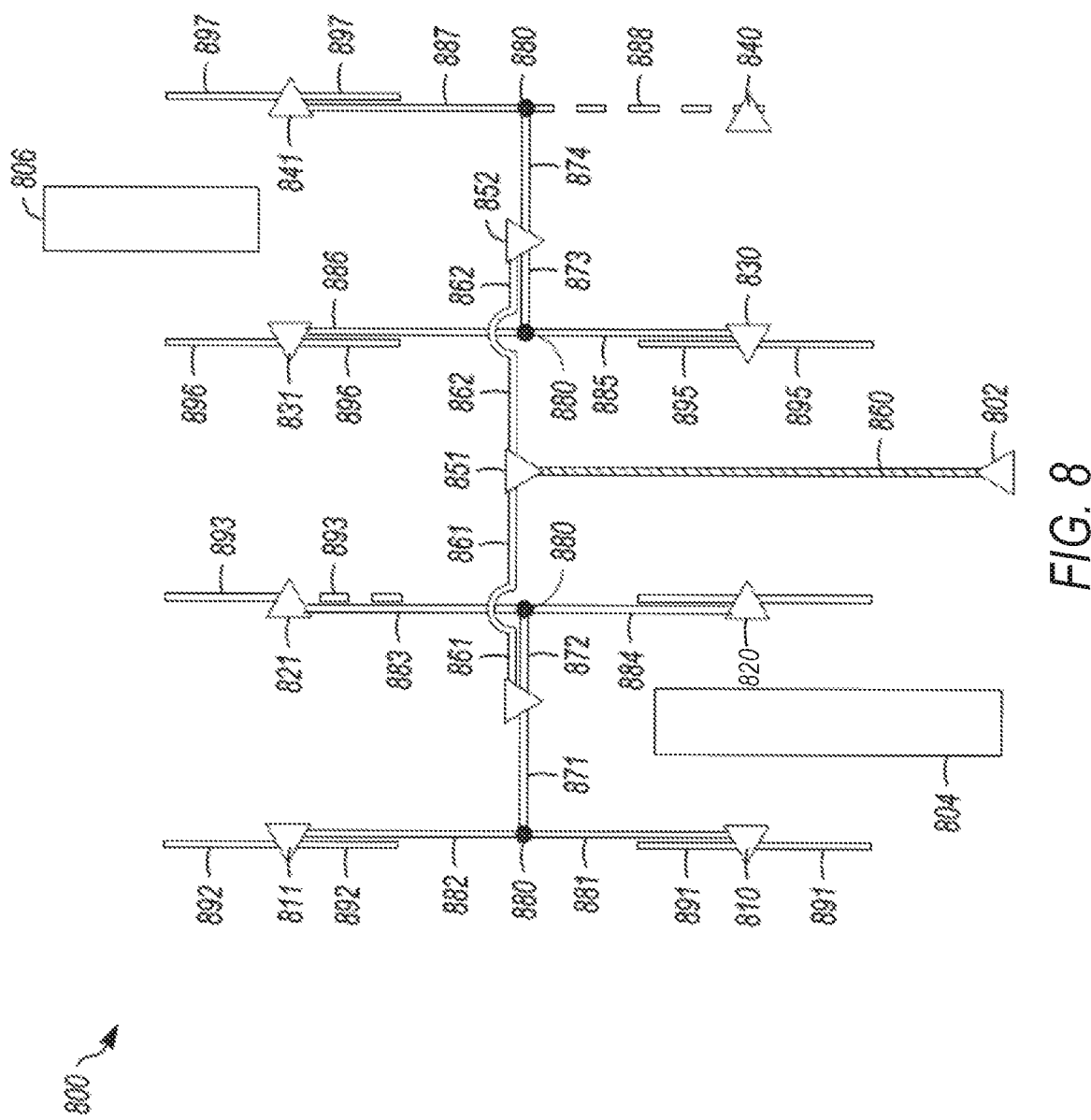
FIG. 8 illustrates aspects of routing tree generation, in accordance with some embodiments described herein.

FIG. 8 then illustrates the final structure as the final wavefront analysis (e.g., from the single branch point associated with connection 770) reaches source 802. In system 800 of FIG. 8, all routes 891-897, 881-888, 871-874, and 860-862 are set, including routes such as route 888, which is included for balance and not to connect to any circuit design sink element. Such dash edges indicate pseudo branches that are required to achieve wire balancing. Additionally, repeaters 810, 811, 820, 821, 831, 830, 840, 841, and 851 are added. This results in a balanced routing structure with repeaters for a partially blocked sink grid, in accordance with embodiments described herein.

Figure 9:
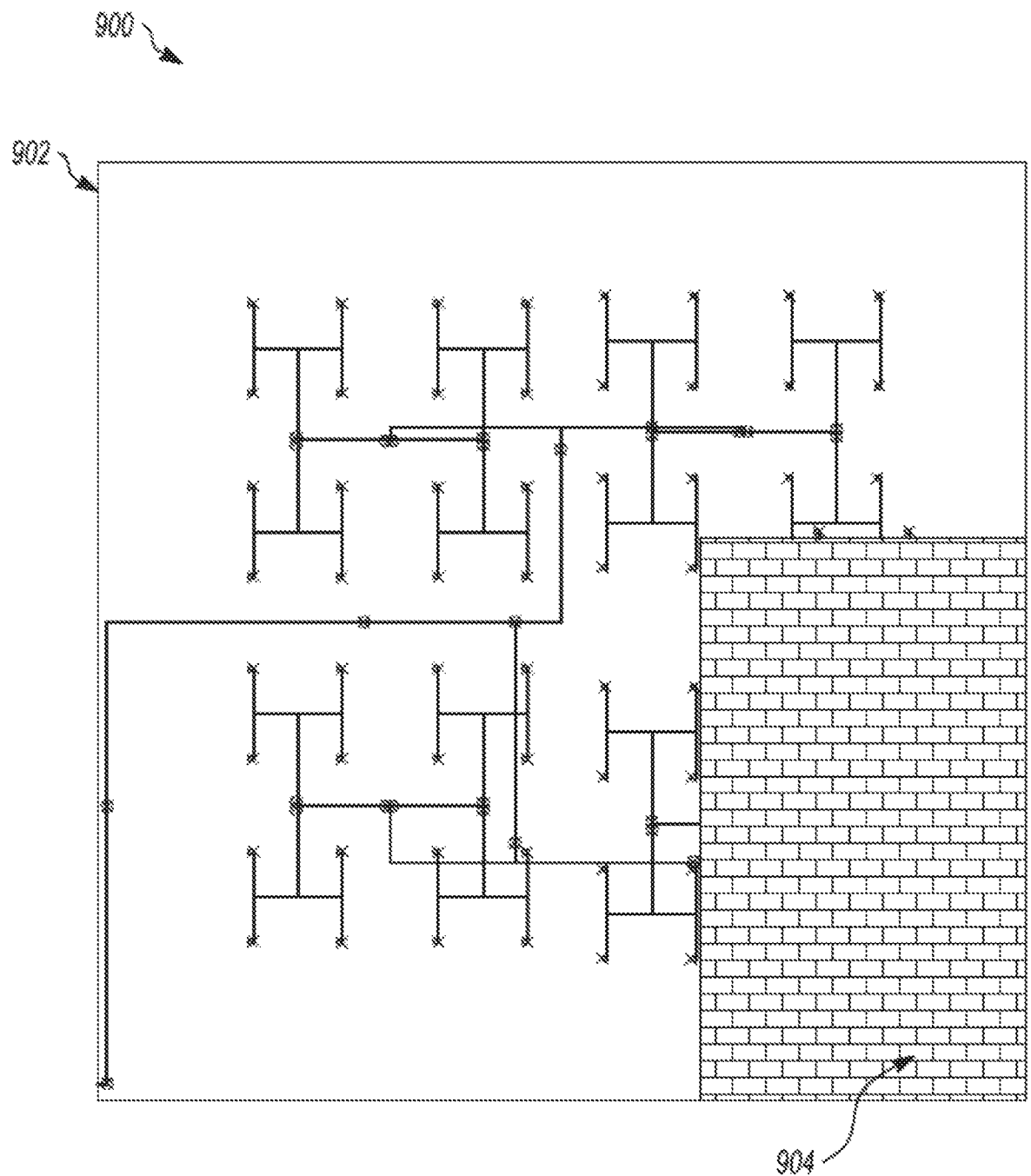
FIG. 9 illustrates an example balanced routing tree, in accordance with some embodiments described herein.

FIG. 9 illustrates a more complex balanced routing structure which may be created in accordance with the embodiments described above. System 900 includes layout 902 with obstruction 904. Following the operations described above, the complex routing structure to connect a source with a plurality of sinks may be followed to provide improved operations for creating a balanced routing structure. As described above, further complexity may be added in such systems to create routing tree structures which connect hundreds or many thousands of sinks to a source. Some such embodiments include improvements both with respect to options to vary the length of the source to sink path due to the cost-based branch point selection and the top-down pass, which allows wavefront analysis not to proceed on branches to implement a short source-to-sink path link, which improves performance of computing devices by improving processors operations and enabling more complex or faster computing operations.

Figure 10:
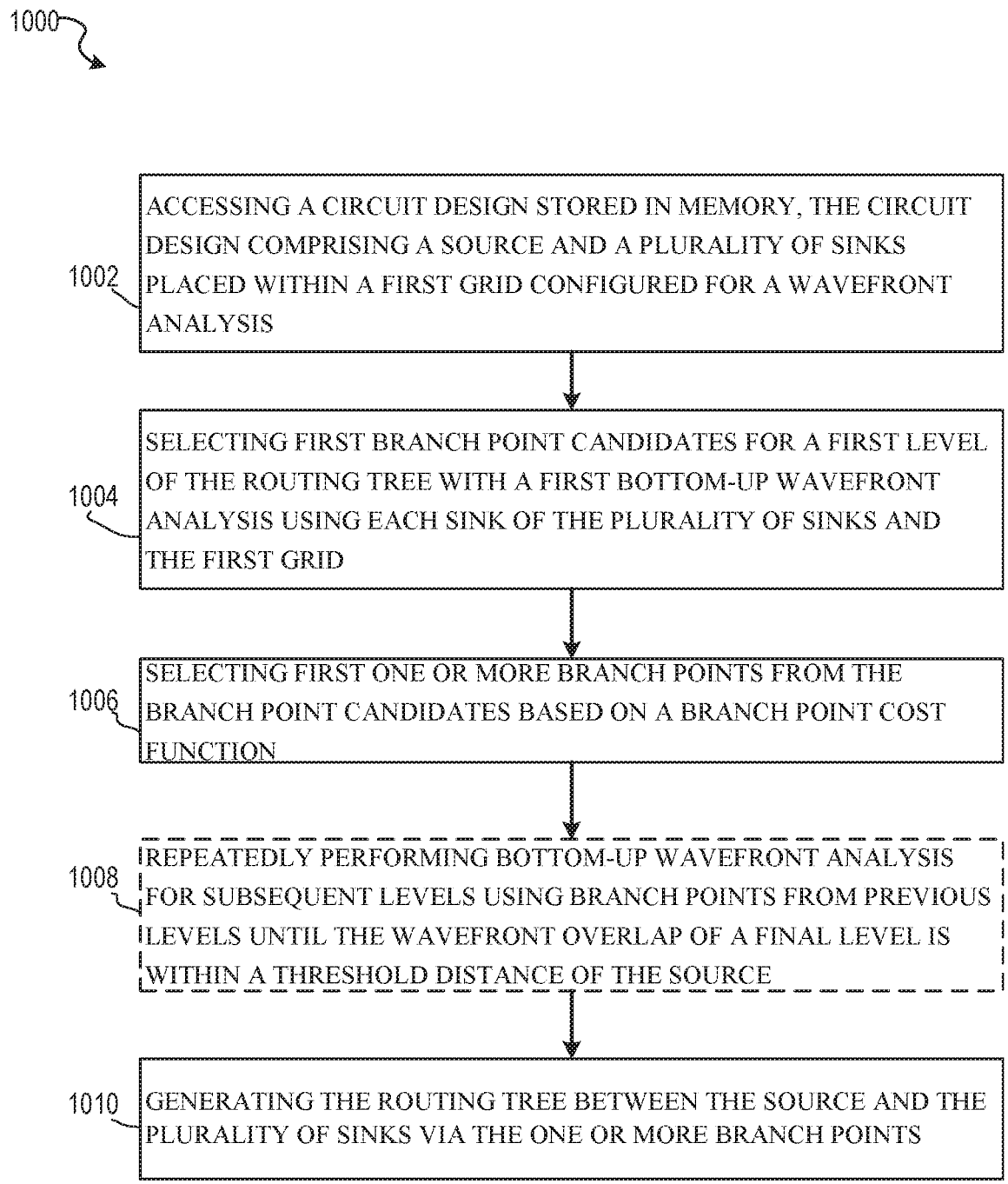
FIG. 10 describes a method for routing tree generation, in accordance with some embodiments.

FIG. 10 describes a method 1000 for routing tree generation, in accordance with some embodiments. In some embodiments, method 1000 is performed by an EDA computing device with one or more processors which may be configured for additional EDA operations as part of a circuit design process which may involve additional operations from FIG. 1. In some embodiments, method 1000 is embodied in computer-readable instructions stored in a non-transitory storage device, such that when the instructions are executed by one or more processors of a device, the device performs method 1000.

Method 1000 begins with operation 1002 involving accessing a circuit design stored in memory in order to generate a routing tree for the circuit design, where the circuit design includes a source and a plurality of sinks. The circuit design may additionally include grid layout information (e.g., GCELL data) which may include information on blockages (e.g., which allow routing but do not allow object or buffer placement) and obstructions (e.g., which do not allow any placement including routing and objects). Method 1000 then proceeds with a wavefront analysis in operation

1004 by selecting first branch point candidates for a first level of the routing tree with a first bottom-up wavefront analysis using each sink of the plurality of sinks. In operation 1006 first one or more branch points from the branch point candidates are selected based on a branch point cost function. As described above, various embodiments may use additional criteria for selection of specific branch points, including the addition of pseudo branch points to create balance in the tree structure, use of grid based groupings, or use of other grouping heuristics in addition to cost function analysis for the candidates. Depending on the specific structure of the circuit design, any number of levels may be present with repeated bottom-up wavefront analysis performed for each level in optional operation(s) 1008. if such repeated operations are used, they repeat until the final wavefront overlaps with the source (e.g., identifies the route to the source from the last branch point(s). Once all routing via branch points has been identified, operation 1010 involves generating, using the one or more hardware processors, the routing tree and associated buffer placement between the source and the plurality of sinks via the one or more branch points, and may also involve generating an updated circuit design and associated physical circuit devices based at least in part on the updated routing tree.

Some such embodiments operate to select the candidates by selecting first and second branch point candidates, with second branch point candidates for a second level of the routing tree with a second bottom-up wavefront analysis using the one or more branch points. The operation then selects second one or more branch points from the second branch point candidates based on the branch point cost function, and connects the source and the plurality of sinks via the second one or more branch points.

Such embodiments may further involve a third bottom-up wavefront analysis using the second one or more branch points and determining that the wavefronts identify branch point candidates within a threshold distance of the source. Generation of the routing tree may then be based on the determination that the wavefronts identify branch point candidates within a threshold distance of the source. The routing may thus proceed from a source via various tiers of branch points to the sinks.

In some embodiments the bottom-up (e.g., sink to source) wavefront analysis comprises determining a first wavefront for each sink of the plurality of sinks, wherein the first wavefront for each sink is a first distance from the corresponding sink. A determination is then made as to whether the first wavefront fur each sink overlaps with the first wavefront for any other sink by a threshold amount. For overlapping first wavefronts, branch point candidates for the sinks corresponding to the overlapping first wavefronts are determined based on a corresponding overlap area. For first wavefronts with no overlapping wavefront, determining a second wavefront (e.g., incremental expansion of the wavefront) is performed, wherein each second wavefront is a second distance from the corresponding sink, wherein the second distance is greater than the first distance.

Some such embodiments operate with the wavefront analysis including operations comprising setting an incremental distance at a first value, calculating a wavefront at the incremental distance from each sink, determining any wavefronts which overlap by more than a threshold amount, selecting branch point candidates for the sinks corresponding to the wavefronts that overlap by more than the threshold amount, and repeatedly increasing the incremental distance and selecting branch point candidates for overlapping wavefronts until each sink is associated with corresponding branch point candidates. In some such embodiments, the threshold amount varies between different overlapping wavefronts based on an obstruction present in an overlapping area.

In some embodiments, a bottom-up wavefront analysis comprises repeatedly performing a bottom-up wavefront analysis at a plurality of levels using wavefronts originating from sinks or branch points of a previous level until the wavefronts of the final level reach the source.

In some embodiments, generating the routing tree comprises selecting routes via selected branch points and buffer insertion along the routes. In some embodiments, at each level of the plurality of levels, the system tests a horizontal and a vertical clustering direction and selects a clustering direction based on blockages. Branch point candidates and routings between the selected branch points are then filtered based on the selected clustering direction. In some embodiments, this is in addition to the branch point selection based on cost function analysis. In some embodiments, the cost function comprises a weighted value for a difference between a branch length pair and a target branch length. In some embodiments, the cost function comprises a weighted value for a difference between branch lengths of a given pair. In some embodiments, the cost function comprises a weighted value of a number of turns times a base length for routes to a branch point. In some embodiments, the cost function comprises a weighted value of a base length times a length increase value for routes to a branch point. Such a value may enable a weighted preference for certain lengths or shorter lengths of routings by providing various different costs for different lengths, which may be non-linear while providing comparative value tradeoffs with other routes having other costs (e.g. a greater number of turns vs. a shorter length). In some embodiments, the cost function comprises a length mismatch value, an imbalance value, a turn value, and a repeater level increase value.

In some embodiments, the operations then proceed with generating or initiating generation of a set of masks from the updated circuit design for use in generating an integrated circuit comprising the updated circuit design. The component arrangement defined and generated in the above operations may then be used to fabricate (e.g., generate) or initiate generation of an integrated circuit using the component arrangement. In various embodiments, various devices, systems, and methods are used to fabricate devices based on the updated circuit design. In some embodiments, this includes generation of masks and the use of machinery for circuit fabrication. In various implementations, files generated by embodiments described herein are used to create photolithographic masks for lithography operations used to generate circuits according to a circuit design, where a pattern defined by the masks is used in applying a thin uniform layer of viscous liquid (photo-resist) on the wafer surface. The photo-resist is hardened by baking and then selectively removed by projection of light through a reticle containing mask information. In some implementations, the files are further used for etching patterning, where unwanted material from the surface of the wafer is removed according to details described in the design files, where a pattern of the photo-resist is transferred to the wafer by means of etching agents. In some embodiments, aspects of design files generated according to the operations described herein are used for deposition operations, where films of the various materials are applied on the wafer. This may involve physical vapor deposition (PVD), chemical vapor deposition (CVD) or any such similar processes. Some embodiments may use files generated according to operations described herein for chemical mechanical polishing, where a chemical slurry with etchant agents is used to planarize to the wafer surface; for oxidation where dry oxidation or wet oxidation molecules convert silicon layers on top of the wafer to silicon dioxide; for ion implantation where dopant impurities are introduced into a semiconductor using a patterned electrical field; or for diffusion where bombardment-induced lattice defects are annealed. Thus, in various embodiments, systems and operations include not only computing devices for generating updated circuit design files, but also hardware systems for fabricating masks, controlling IC fabrication hardware, and the hardware and operations for fabricating a circuit from a circuit design (e.g., component arrangement) generated in accordance with various embodiments described herein.

Additionally, it will be apparent that any apparatus or operations described herein in accordance with various embodiments may be structured with intervening, repeated, or other elements while still remaining within the scope of the contemplated embodiments. Some embodiments may include multiple receivers, along with any other circuit elements. Some embodiments may function with described operating modes as well as other operating modes. The various embodiments described herein are thus presented as examples, and do not exhaustively describe every possible implementation in accordance with the possible embodiments.

Figure 11:
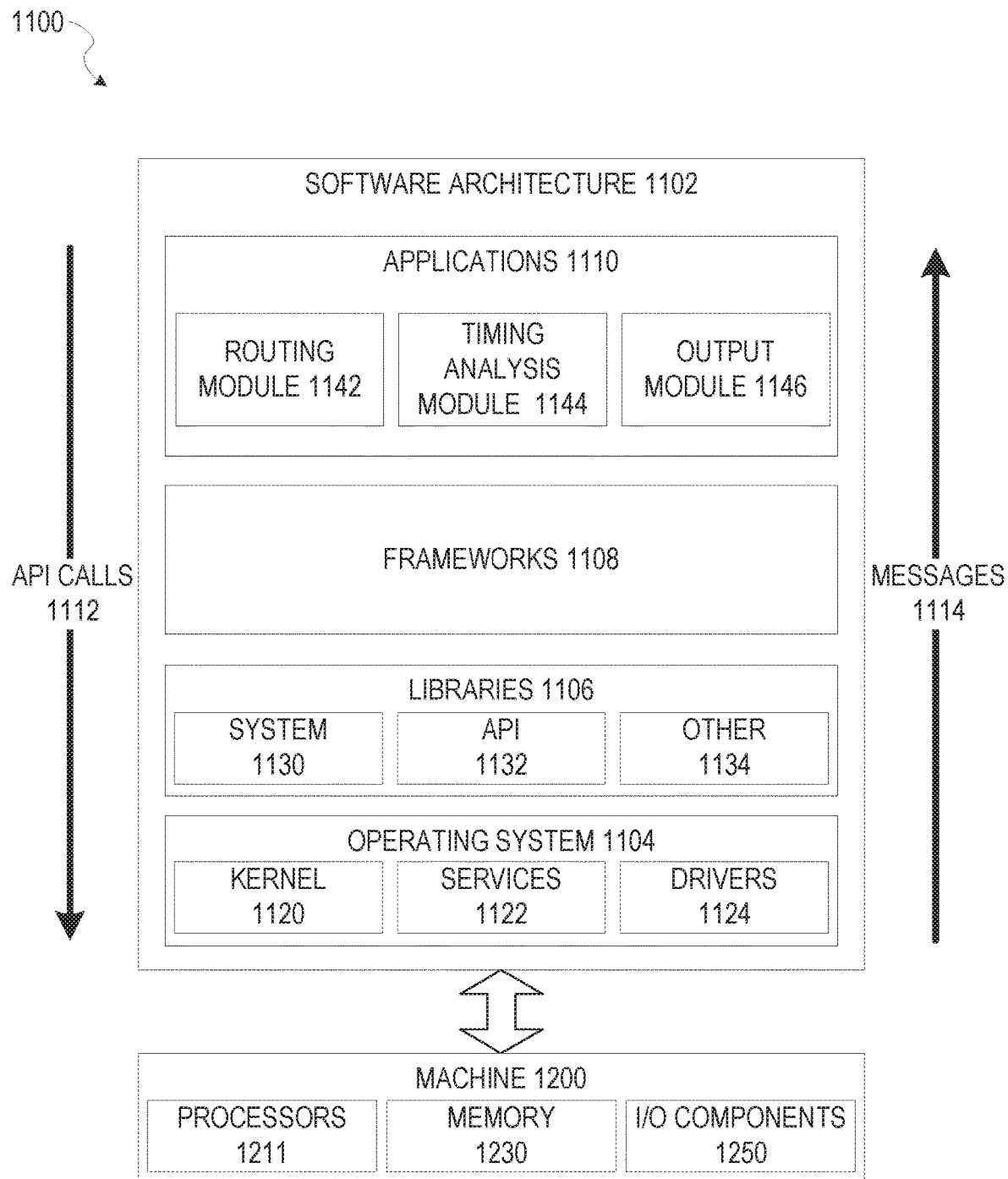
FIG. 11 is a block diagram illustrating an example of a software architecture that may be operating on an EDA computer and used with methods for routing tree generation to update a circuit design, according to some example embodiments.

FIG. 11 is a block diagram 1100 illustrating an example of a software architecture 1102 that may be operating on an EDA computer and used with methods for modifying a balanced clock structure, according to some example embodiments. Software architecture 1102 can be used as an electronic design automation computing device to implement any of the methods described above. Aspects of software architecture 1102 may, in various embodiments, be used to store circuit designs and execute timing analysis or optimization in an EDA environment to generate circuit designs, with physical devices generated using these circuit designs.

FIG. 11 is merely a non-limiting example of a software architecture 1102, and it will be appreciated that many other architectures can be implemented to facilitate the functionality described herein. In various embodiments, the software architecture 1102 is implemented by hardware such as machine 1200 that includes processors 1210, memory 1230, and input/output (I/O) components 1250. In this example, the software architecture 1102 can be conceptualized as a stack of layers where each layer may provide a particular functionality. For example, the software architecture 1102 includes layers such as an operating system 1104, libraries 1106, frameworks 1108, and applications 1110. Operationally, the applications 1110 invoke application programming interface (API) calls 1112 through the software stack and receive messages 1114 in response to the API calls 1112, consistent with some embodiments. In various embodiments, any client device, server computer of a server system, or any other device described herein may operate using elements of software architecture 1102. An EDA computing device described herein may additionally be implemented using aspects of the software architecture 1102, with the architecture 1102 adapted for operating to perform clock synthesis and modification of balanced clock structures in accordance with embodiments herein.

In one embodiment, an EDA application of applications 1110 performs routing tree generation and/or adjustments, according to embodiments described herein, using various modules within software architecture 1102. For example, in one embodiment, an EDA computing device similar to machine 1200 includes memory 1230 and one or more processors 1210. The processors 1210 implement a routing module 1142 to generate an updated routing tree from an initial routing tree based on criteria for an integrated circuit design. The processors 1210 also implement a timing analysis module 1144 to determine whether an updated routing tree meets timing criteria for the circuit design. The routing tree is finalized by an output module 1146 if the criteria/design thresholds are met and updated by routing module 1142 if the criteria/design thresholds are not met.

In some embodiments, processor-implemented output module 1146 may then be used to update a display of I/O components 1250 of the EDA computing device with data associated with the updated routing tree generated by the process.

in various other embodiments, rather than being implemented as modules of one or more applications 1110, some or all of modules 1142, 1144, and 1146 may be implemented using elements of libraries 1106 or operating system 1104.

In various implementations, the operating system 1104 manages hardware resources and provides common services. The operating system 1104 includes, for example, a kernel 1120, services 1122, and drivers 1124, The kernel 1120 acts as an abstraction layer between the hardware and the other software layers, consistent with some embodiments. For example, the kernel 1120 provides memory management, processor management (e.g., scheduling), component management, networking, and security settings, among other functionality. The services 1122 can provide other common services for the other software layers. The drivers 1124 are responsible for controlling or interfacing with the underlying hardware, according to some embodiments. For instance, the drivers 1124 can include display drivers, signal processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 1106 provide a low-level common infrastructure utilized by the applications 1110. The libraries 1106 can include system libraries 1130 such as libraries of multi-instance blocks for use in an EDA environment or other libraries that can provide functions such as memory allocation functions, string manipulation functions, mathematic functions, and the like. In addition, the libraries 1106 can include API libraries 1132 such as media. libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1106 may also include other libraries 1134.

The software frameworks 1108 provide a high-level common infrastructure that can be utilized by the applications 1110, according to some embodiments. For example, the software frameworks 1108 provide various graphic user interface (GUI) functions, high-level resource management, high-level location services, and so forth. The software frameworks 1108 can provide a broad spectrum of other APIs that can be utilized by the applications 1110, some of which may be specific to a particular operating system 1104 or platform. In various embodiments, the systems, methods, devices, and instructions described herein may use various files, macros, libraries, and other elements of an EDA design environment to implement analysis described herein. This includes analysis of input design files for an integrated circuit design, along with any element of hierarchical analysis that may be used as part of or along with the embodiments described herein. While netlist files, library files, SDC files and viewdefinition files are examples that may operate within a software architecture 1102, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 1200 including processors 1210), with these operations being accessible via a network (e.g., the Internet) and via one or more appropriate interfaces (e.g., an API). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine 1200, but deployed across a number of machines 1200. In some example embodiments, the processors 1210 or processor-implemented modules are located in a single geographic location (e.g., within a home environment, an office environment, or a server farm). In other example embodiments, the processors 1210 or processor-implemented modules are distributed across a number of geographic locations.

Figure 12:
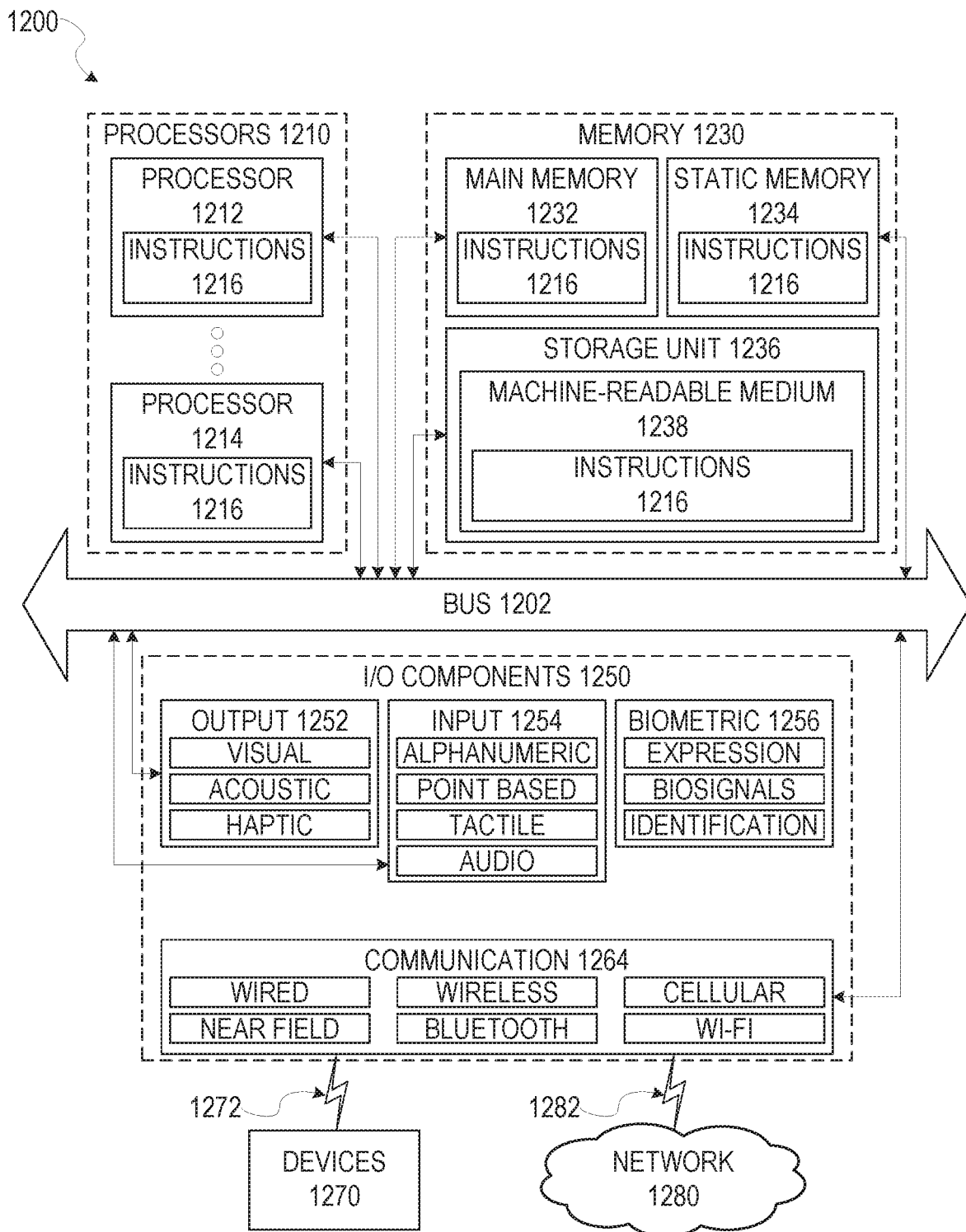
FIG. 12 is a diagrammatic representation of a machine in the form of a computer system within which a set of instructions are executed, causing the machine to perform any one or more of the methodologies discussed herein, according to some example embodiments.

FIG. 12 is a diagrammatic representation of the machine 1200 in the form of a computer system within which a set of instructions may be executed for causing the machine 1200 to perform any one or more of the methodologies discussed herein, according to an example embodiment. FIG. 12 shows components of the machine 1200, which is, according to some embodiments, able to read instructions from a machine-readable medium (e.g., a machine-readable storage medium) and perform any one or more of the methodologies discussed herein. In some embodiments, the machine 1200 may operate with instructions 1216 (e.g., software, a program, an application, an applet, an app, or other executable code) for causing the machine 1200 to perform any one or more of the methodologies discussed. In alternative embodiments, the machine 1200 operates as a standalone device or can be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a set-top box (STB), a. personal digital assistant (PDA), a media system, a cellular telephone, a smart phone, a mobile device, or any machine capable of executing the instructions 1216, sequentially or otherwise, that specify actions to be taken by the machine 1200. Further, while only a single machine 1200 is illustrated, the term "machine" shall also be taken to include a collection of machines 1200 that individually or jointly execute the instructions 1216 to perform any one or more of the methodologies discussed herein.

In various embodiments, the machine 1200 comprises processors 1210, memory 1230, and I/O components 1250, which can be configured to communicate with each other via a bus 1202. In an example embodiment, the processors 1210 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 1212 and a processor 1214 that may execute the instructions 1216. The term "processor" is intended to include multi-core processors 1210 that may comprise two or more independent processors 1212, 1214 (also referred to as "cores") that can execute instructions 1216 contemporaneously. Although FIG. 12 shows multiple processors 1210, the machine 1200 may include a single processor 1212 with a single core, a single processor 1212 with multiple cores (e.g., a multi-core processor 1212), multiple processors 1210 with a single core, multiple processors 1210 with multiples cores, or any combination thereof.

The memory 1230 comprises a main memory 1232, a static memory 1234, and a storage unit 1236 accessible to the processors 1210 via the bus 1202, according to some embodiments. The storage unit 1236 can include a machine-readable medium 1238 on which are stored the instructions 1216 embodying any one or more of the methodologies or functions described herein. The instructions 1216 can also reside, completely or at least partially, within the main memory 1232, within the static memory 1234, within at least one of the processors 1210 (e.g., within the processor's cache memory), or any suitable combination thereof, during execution thereof by the machine 1200. Accordingly, in various embodiments, the main memory 1232, the static memory 1234, and the processors 1210 are considered machine-readable media 1238.

As used herein, the term "memory" refers to a machine-readable medium 1238 able to store data temporarily or permanently and may be taken to include, but not be limited to, random-access memory (RAM), read-only memory (ROM), buffer memory, flash memory, and cache memory. While the machine-readable medium 1238 is shown, in an example embodiment, to be a single medium, the term "machine-readable medium" should be taken to include a single medium or multiple media (e.g., a centralized or distributed database, or associated caches and servers) able to store the instructions 1216. The term "machine-readable medium" shall also be taken to include any medium, or combination of multiple media, that is capable of storing instructions (e.g., instructions 1216) for execution by a machine (e.g., machine 1200), such that the instructions 1216, when executed by one or more processors of the machine 1200 (e.g., processors 1210), cause the machine 1200 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1250 include a wide variety of components to receive input, provide output, produce output, transmit information, exchange information, capture measurements, and so on. In general, it will be appreciated that the I/O components 1250 can include many other components that are not shown in FIG. 12. The I/O components 1250 are grouped according to functionality merely for simplifying the following discussion, and the grouping is in no way limiting. In various example embodiments, the I/O components 1250 include output components 1252 and input components 1254. The output components 1252 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1254 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow 100, or outputs for circuit fabrication. In various embodiments, outputs of a timing analysis are used to generate updates and changes to a circuit design, and after a final closure of timing with all associated timing thresholds and design requirements met, circuit design output files are used to generate masks and other physical outputs for generation of a circuit. As described herein, "requirements," "design elements," and other aspects of a circuit design refer to selectable values that are set as part of the design of a circuit. Such design requirements or elements may be adjusted by a system operator or circuit designer to suit the particular goals of a project or circuit that results from the operations described herein.

Communication can be implemented using a wide variety of technologies. The I/O components 1250 may include communication components 1264 operable to couple the machine 1200 to a network 1280 or devices 1270 via a coupling 1282 and a coupling 1272, respectively. For example, the communication components 1264 include a network interface component or another suitable device to interface with the network 1280. In further examples, communication components 1264 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1270 may be another machine or any of a wide variety of peripheral devices (e.g., a peripheral device coupled via a USB).

Transmission Medium

In various example embodiments, one or more portions of the network 1280 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1280 or a portion of the network 1280 may include a wireless or cellular network, and the coupling 1282 may be a Code Division Multiple Access (CDMA) connection, a Global System for Mobile communications (GSM) connection, or another type of cellular or wireless coupling. In this example, the coupling 1282 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-speed Packet Access (HSPA), Worldwide Interoperability for Microwave Access (WiMAX), Long Term Evolution (LTE) standard, others defined by various standard-setting organizations, other long range protocols, or other data transfer technology.

Furthermore, the machine-readable medium 1238 is non-transitory (in other words, not having any transitory signals) in that it does not embody a propagating signal. However, labeling the machine-readable medium 1238 "non-transitory" should not be construed to mean that the medium 1238 is incapable of movement; the medium 1238 should be considered as being transportable from one physical location to another. Additionally, since the machine-readable medium 1238 is tangible, the medium 1238 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A computerized method for routing tree construction, the method comprising:
   accessing, using one or more hardware processors, a circuit design stored in memory, the circuit design comprising a source and a plurality of sinks;
   selecting, by the one or more hardware processors, first branch point candidates for a first level of a routing tree with a first bottom-up wavefront analysis using each sink of the plurality of sinks;
   selecting, by the one or more hardware processors, first one or more branch points from the first branch point candidates based on a branch point cost function;

generating, using the one or more hardware processors, the routing tree between the source and the plurality of sinks via the first one or more branch points; and generating, using the one or more hardware processors, an updated circuit design based at least in part on the routing tree.

2. The computerized method of claim 1, further comprising:

selecting second branch point candidates for a second level of the routing tree with a second bottom-up wavefront analysis using the first one or more branch points;

selecting second one or more branch points from the second branch point candidates based on the branch point cost function; and wherein the routing tree further connects the source and the plurality of sinks via the second one or more branch points.

3. The computerized method of claim 2, further comprising:

performing a third bottom-up wavefront analysis using the second one or more branch points;

determining that wavefronts of the third bottom-up wavefront analysis identify branch point candidates within a threshold distance of the source; and initiating generation of the routing tree based on the determination that the wavefronts of the third bottom-up wavefront analysis identify branch point candidates within the threshold distance of the source.

4. The computerized method of claim 2, wherein the first bottom-up wavefront analysis comprises:

determining a first wavefront for each sink of the plurality of sinks, wherein the first wavefront for each sink is a first distance from a corresponding sink;

determining whether the first wavefront for each sink overlaps with another first wavefront for any other sink by a threshold amount;

for overlapping first wavefronts, determining branch point candidates for sinks corresponding to the overlapping first wavefronts based on a corresponding overlap area; and for first wavefronts with no overlapping wavefront, determining a second wavefront, wherein each second wavefront is a second distance from the corresponding sink, wherein the second distance is greater than the first distance.

5. The computerized method of claim 2, wherein the first bottom-up wavefront analysis comprises:

setting an incremental distance at a first value;

calculating a wavefront at the incremental distance from each sink or each previous tier branch point;

determining any wavefronts which overlap by more than a threshold amount;

selecting initial branch point candidates of the first branch point candidates for the sinks corresponding to the wavefronts that overlap by more than the threshold amount; and repeatedly increasing the incremental distance and selecting additional branch point candidates of the first branch point candidates for overlapping wavefronts until each sink is associated with corresponding branch point candidates.

6. The computerized method of claim 5, wherein the threshold amount varies between different overlapping wavefronts based on an obstruction present in an overlapping area.

7. The computerized method of claim 1, wherein the first bottom-up wavefront analysis comprises:

repeatedly performing a corresponding bottom-up wavefront analysis at a plurality of levels using wavefronts originating from sinks or branch points of a previous level until a wavefront for a final level reaches a threshold distance from the source.

8. The computerized method of claim 7, wherein generating the routing tree comprises:

selecting routes via selected branch points; and inserting buffers along the routes.

9. The computerized method of claim 8, further comprising:

at each level of the plurality of levels, testing horizontal and a vertical clustering direction;

selecting a selected clustering direction based on blockages; and.

selecting the routes and the selected branch points based on the selected clustering direction.

10. The computerized method of claim 1, wherein the branch point cost function comprises a weighted value for a difference between a branch length pair and a target branch length.

11. The computerized method of claim 1, wherein the branch point cost function comprises a weighted value for a difference between branch lengths of a given pair of branches.

12. The computerized method of claim 1, wherein the branch point cost function comprises a weighted value of a number of turns times a base length for routes to a given branch point.

13. The computerized method of claim 1, wherein the branch point cost function comprises a weighted value of a base length cost value times value a length increase value for routes to a given branch point.

14. The computerized method of claim 1, wherein the branch point cost function comprises a length mismatch value, an imbalance value, a turn value, and a repeater level increase value.

15. The computerized method of claim 1, further comprising generating a set of masks from the updated circuit design for use in generating an integrated circuit comprising the updated circuit design.

16. A device for generating a circuit design, the device comprising:

a memory configured to store the circuit design, the circuit design comprising a source and a plurality of sinks; and one or more processors coupled to the memory and configured to perform operations for generating an updated circuit design, the operations comprising:

accessing the circuit design stored in memory;

performing an initial first bottom-up wavefront analysis using each sink of the plurality of sinks to select initial branch points;

repeatedly performing a bottom-up wavefront analysis using each branch point from a previous level to select branch points for a current level until the branch points for the current level are within a threshold distance of the source;

selecting routes for a routing tree using the initial branch points and the branch points for each level;

running a symmetrical buffer insertion process for the routes for the routing tree; and generating an updated circuit design based at least in part on the routes for the routing tree and the symmetrical buffer insertion process.

17. The device of claim 16, wherein the operations further comprise initiating fabrication of circuitry using the updated circuit design.

18. A non-transitory computer-readable storage medium comprising instructions that, when executed by one or more processors of a computing device, cause the device to perform operations for electronic design automation, the operations comprising:
- accessing a circuit design stored in memory, the circuit design comprising a source and a plurality of sinks placed within a first grid configured for a wavefront analysis;
- selecting first branch point candidates for a first level of a routing tree with a first bottom-up wavefront analysis using each sink of the plurality of sinks and the first grid;
- selecting first one or more branch points from the first branch point candidates based on a branch point cost function;
- performing the bottom-up wavefront analysis for one or more subsequent levels of the routing tree using each branch point from a previous level to select branch points for a current level until the branch points for the current level are within a threshold distance of the source;
- generating the routing tree between the source and the plurality of sinks via the first one or more branch points and selected sets of branch points for the one or more subsequent levels; and
- generating an updated circuit design based at least in part on the routing tree between the source and the plurality of sinks.

19. The non-transitory computer readable medium of claim 18, wherein the first bottom-up wavefront analysis comprises:
- configuring a wavefront data structure for each sink, each wavefront data structure comprising a cost value and one or more positions within the first grid which are each a set distance from the associated sink;
- repeatedly calculating an incremented wavefront data structure for each wavefront data structure based on an increase in the set distance and an associated increase in the cost value until each one or more positions within the first grid for each wavefront data structure overlaps with another one or more positions within the first grid for another wavefront data structure by a threshold amount; and
- selecting branch point candidates based on corresponding overlaps for each one or more positions within the first grid for each wavefront data structure that overlaps with another one or more positions within the first grid for another wavefront data structure.

20. The non-transitory computer readable medium of claim 19, wherein the first one or more branch points are further selected from the branch point candidates by:
- assigning a row and column number to each sink of the plurality of sinks;
- determining a first overall cost for a level based on pairing sinks in a horizontal direction along the first grid;
- determining a second overall cost for the level based on pairing sinks in a vertical direction along the first grid; and
- eliminating one or more branch point candidates based on a difference between the first overall cost and the second overall cost.

\* \* \* \* \*